United States Patent
Kohlberger

(10) Patent No.: US 9,673,487 B2
(45) Date of Patent: Jun. 6, 2017

(54) BATTERY WITH A MONITORING CIRCUIT AND FOR USE IN A MOTOR VEHICLE

(71) Applicants: Robert Bosch GmbH, Stuttgart (DE); Samsung SDI Co., Ltd., Yongin-si, Gyeonggi-do (KR)

(72) Inventor: Markus Kohlberger, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 189 days.

(21) Appl. No.: 13/971,548

(22) Filed: Aug. 20, 2013

(65) Prior Publication Data

US 2014/0065454 A1    Mar. 6, 2014

(30) Foreign Application Priority Data

Aug. 29, 2012   (DE) .................. 10 2012 215 333

(51) Int. Cl.
| | |
|---|---|
| *H01M 10/42* | (2006.01) |
| *H01M 10/48* | (2006.01) |
| *H01M 2/34* | (2006.01) |
| *H01M 2/02* | (2006.01) |

(52) U.S. Cl.
CPC .......... *H01M 10/425* (2013.01); *H01M 2/34* (2013.01); *H01M 10/486* (2013.01); *H01M 2/0285* (2013.01); *H01M 2/348* (2013.01); *H01M 2200/106* (2013.01); *H01M 2220/20* (2013.01)

(58) Field of Classification Search
CPC ...................................................... H01M 10/48
See application file for complete search history.

(56) References Cited

U.S. PATENT DOCUMENTS

| | | | | |
|---|---|---|---|---|
| 4,160,857 A * | 7/1979 | Nardella | ............... | H01M 2/105 |
| | | | | 429/97 |
| 7,550,950 B2 * | 6/2009 | Tsubaki | ............... | H02J 7/0031 |
| | | | | 320/150 |

FOREIGN PATENT DOCUMENTS

| | | |
|---|---|---|
| DE | 197 14 847 B4 | 10/1998 |
| JP | EP 2320497 A1 * | 5/2011 ............. H01M 2/32 |

* cited by examiner

*Primary Examiner* — Patrick Ryan
*Assistant Examiner* — Zhongqing Wei
(74) *Attorney, Agent, or Firm* — Maginot, Moore & Beck LLP

(57) ABSTRACT

A battery includes at least one battery cell in a battery cell housing and includes a housing cover having a monitoring circuit. An electrode of the at least one battery cell is connected in an electrically conductive manner to the battery cell housing via a switching mechanism in the monitoring circuit. The monitoring circuit is configured to open the switching mechanism when a malfunction signal is detected. The switching mechanism is closed during normal operation. Separate contacts provide contact to the cell housing in a module assembly and the electrode is disconnectable from the battery cell housing.

7 Claims, 2 Drawing Sheets

BATTERY WITH A MONITORING CIRCUIT AND FOR USE IN A MOTOR VEHICLE

This application claims priority under 35 U.S.C. §119 to patent application no. DE 10 2012 215 333.0, filed on Aug. 29, 2012 in Germany, the disclosure of which is incorporated herein by reference in its entirety.

BACKGROUND

The present disclosure relates to a battery having a battery cell, preferably a lithium-ion battery cell, and further relates to a motor vehicle.

Batteries by way of example lithium ion cell-based batteries or nickel metal hydride batteries are being used in an increasingly wide range of applications due to improved storage capacity, the ability to recharge more frequently and increased energy densities. Lithium ion cell-based batteries are characterized inter alia by high energy densities and an extremely low self-discharge.

Batteries that have a lower energy storage capacity are used for example for small portable electronic devices such as mobile telephones, laptops, camcorders and similar devices, while batteries with higher capacities are used as an energy source for driving motors of hybrid or electric vehicles etc. or as batteries in stationary applications.

Batteries can be embodied for example by way of the series connection of battery modules, wherein to some extent also parallel connections of the battery modules can be provided and the battery modules can for their part comprise series connected and/or parallel connected battery cells.

FIG. 1 illustrates how individual battery cells 10 by way of example having a metal battery cell housing 16 can be combined to form battery modules 12, which in turn are combined to form batteries 14. This is performed by way of a parallel connection or series connection (not illustrated) of the poles, in other words the electrodes 18 of the battery cells 10. By definition, a battery module 12 and/or a battery 14 consists of at least two battery cells 10, wherein the terms "battery" 14 and "battery module" 12 are often used synonymously. The electrical voltage of a battery 14 amounts, for example, to between 120 and 600 volts of direct current.

In the case of so called hard case cells, the housing of which is embodied from a rigid aluminum or steel sheet, usually one of the two electrodes is directly connected to the housing in order to avoid additional potential differences that in the long term can lead to corrosion of the housing. The other electrode is electrically separated from the housing by way of a seal.

The collection of electrodes is insulated in the interior in the usual manner, the housing is contacted at the terminal. This renders it possible downstream of the terminal to install a fuse in the interior of the cell, which fuse, in the event of an external short circuit, disconnects the collection of electrodes and the current is allowed only to flow by way of the housing.

DE000019714847_B4 discloses a method and an embodiment of a battery cell for providing cathodic protection of the battery cell, wherein the metal cell housing of the battery cell is connected to one of the poles of the battery cell by way of a resistor.

SUMMARY

In accordance with the disclosure, a battery is provided according to the description below having a battery cell in an electrically conductive battery cell housing. The battery further comprises a housing cover having a monitoring circuit. The battery is characterized in that an electrode of the battery cell is connected in an electrically conductive manner to the battery cell housing by way of a switching means in the monitoring circuit. As used herein, the terms "switching means" and "switching element" are used interchangeably, and refer to any acceptable switch, switching mechanism, or the like as would be familiar to one of ordinary skill in the art. The monitoring circuit is embodied to open the switching means in the event of a malfunction signal being detected, which switching means is closed during normal operation.

This has the advantage, that separate contacts provide the contact to the cell housing in the module assembly. As a consequence, it is possible to convert the battery to a safe state in the event of damage or other malfunctions. The single electrode can thus be disconnected from the battery cell housing in the event of the insulation between the battery cells becoming damaged. Additionally, insulation malfunctions of the housing can be detected separately from insulation malfunctions of the high voltage path, since the prevailing resistance is different. This all increases the safety and reliability of the battery.

In one possible embodiment, the battery comprises a plurality of battery cells that are connected in a battery module. This creates the electrical connection between the cell housing and the electrode in the module assembly.

The fact that the cell housing has separate contacts means that said cell housing is neutral in the state in which it is delivered from the factory. This renders it possible to monitor the cell protection functions such as the cell internal fuse in a reliable manner, since the neutrality of the housing and/or the insulation of the collection of electrodes can be internally monitored. It is important for the functionality of this fuse that the collection of electrodes in the interior is insulated, thus the current path can be permanently interrupted in the event of an external short circuit.

A spring contact that is connected in an electrically conductive manner to the switching element can be arranged on the housing cover, wherein the spring contact contacts the housing when the cover is in place.

This renders possible a good and simple contact.

The malfunction signal can be an indication that a value of the current that is flowing through the switching means has exceeded a current strength limit value.

The switching element can also be a thermistor element and the malfunction signal can be an indication that a temperature of the switching means has exceeded a temperature limit value. The thermistor element is highly resistive in the case of a temperature above the temperature limit value and said thermistor element conducts electricity in the case of a temperature below the temperature limit value.

As a consequence, the housing is switched automatically and reversibly to neutral in the event of the battery becoming damaged as a result of overheating.

The other electrode of the battery cell can be connected in an electrically conductive manner to the battery cell housing by way of a further switching means in the monitoring circuit, wherein the monitoring circuit is embodied to close the further switching means in the event of a malfunction signal being detected, which switching means is open during normal operation.

As a result, further operation is still possible to a limited extent even in the event of an insulating malfunction between series connected cells.

The switching element and the spring contact can be connected in an electrically conductive manner by means of a stamped circuit board, a cable or a foil circuit board.

In accordance with the disclosure, a motor vehicle having a battery in accordance with the disclosure or in accordance with one of its possible embodiments is further provided.

It is advantageous, particularly in motor vehicles, to use batteries that even in the event of a malfunction are safer and more reliable.

BRIEF DESCRIPTION OF THE DRAWINGS

Exemplary embodiments of the disclosure are further described with reference to the drawings and the following description. In the drawings.

DETAILED DESCRIPTION

The electrodes are connected to the cell housing by way of the cell monitoring switching circuit. This can be directly a branch at the individual voltage tap, or a separate line.

Figure 1:
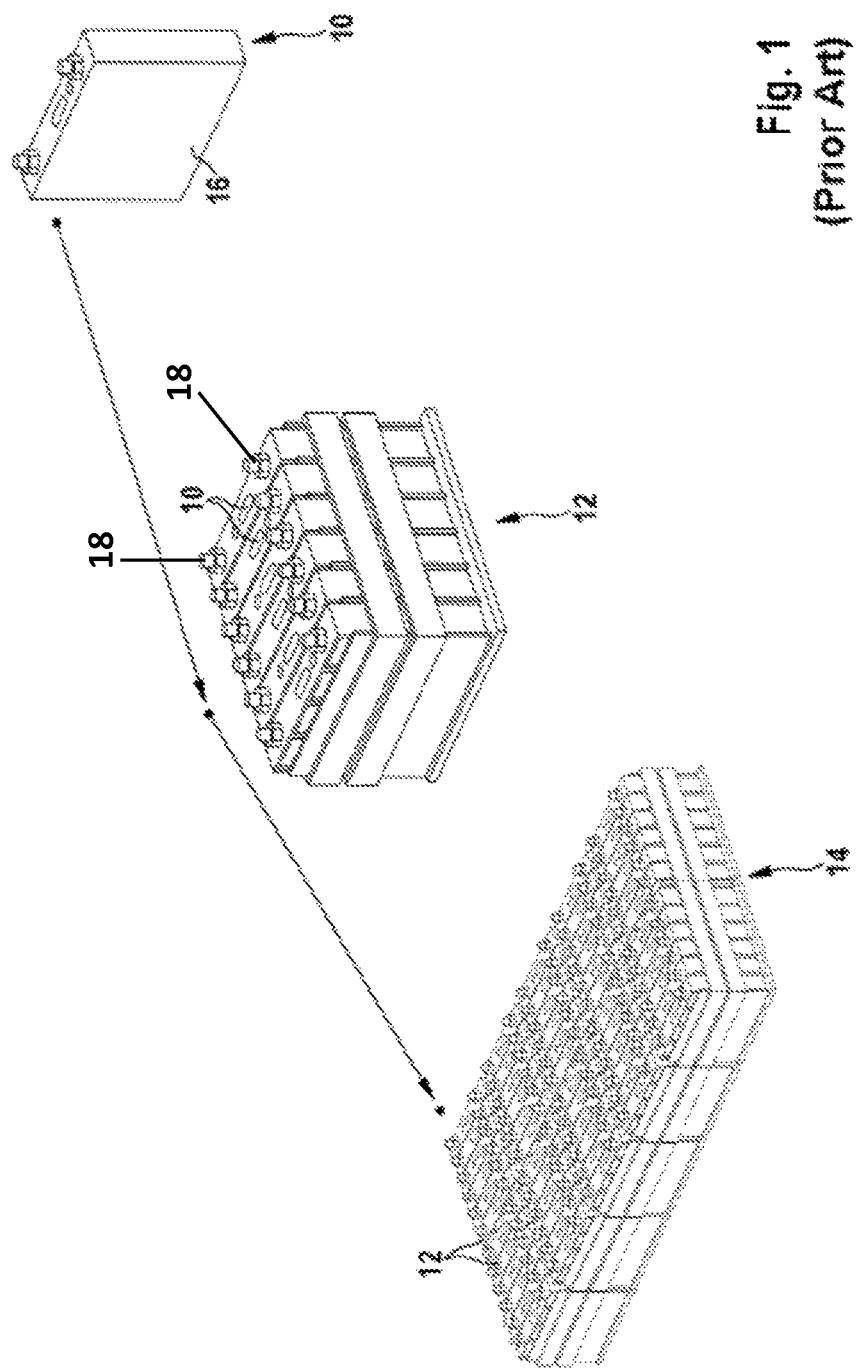
FIG. 1 illustrates a battery cell, a module and a battery according to the prior art.
Figure 2:
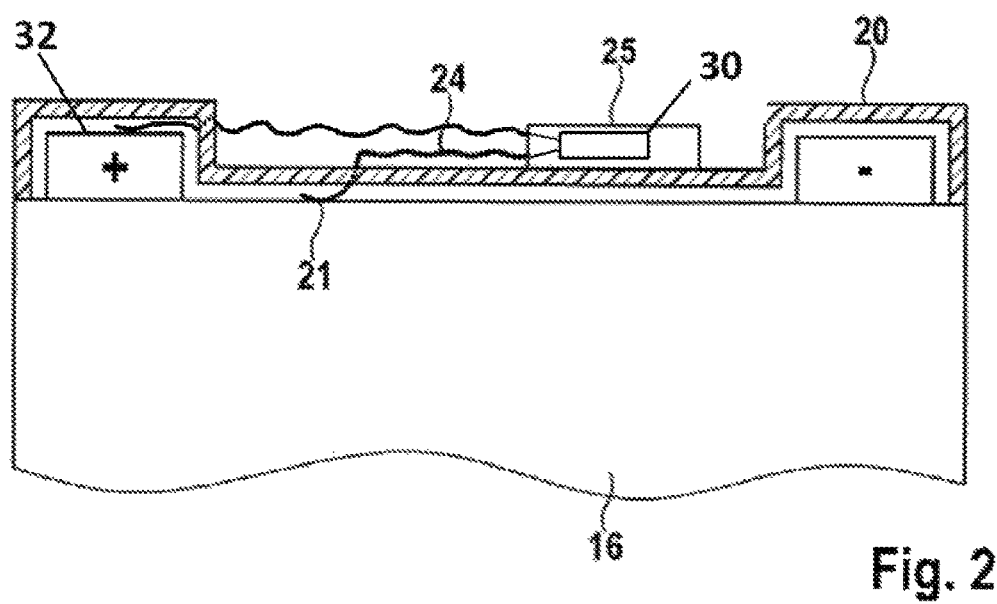
FIG. 2 illustrates an exemplary embodiment of the disclosure.

FIG. 2 illustrates an exemplary embodiment of the disclosure. A spring contact 21 that is fastened on a module cover 20 produces an electrical connection between the cell housing 16 and a switching means 30 in a cell monitoring circuit 25 when the cover 20 is in place, since it is conductively connected to the switching means 30, possibly by means of a stamped circuit, cable or foil plate 24. The cell monitoring device 25 in turn contacts the electrode 32 when the cover 20 is in place and thus connects the switching means 30 in an electrically conductive manner to the electrode 32.

In the event of an insulation malfunction occurring, the contact can be separated in the cell monitoring device, the resistance increases, the current flow is reduced.

In the case of an embodiment as a separate line that is not directly connected to the individual voltage tap, an insulation malfunction of the housing can be detected separately from the insulation malfunction of the high voltage path, since the prevailing resistance is different.

Furthermore, the polarity of the housing can also be reversed. This has for example the consequence that in the event of an insulation malfunction between 20 series connected cells further operation is possible in order, for example, to drive to a repair service.

It is also possible alternatively or additionally, by introducing a thermistor element, for example a fuse that is described as a polymeric positive temperature coefficient (a "PPTC") fuse or a printed circuit thermoplastic (a "PCT" fuse and comprises polymer based positive temperature coefficients, to achieve that the connection becomes highly resistive in the event of a limit temperature of for example 80° C. being exceeded. As a consequence, the housing is automatically switched to neutral in the event of the battery becoming damaged as a result of overheating.

What is claimed is:

1. A battery, comprising:
at least one battery cell including:
an electrode; and
an electrically conductive battery cell housing; and
a housing cover that is mountable on the battery cell housing, and that includes a monitoring circuit having a switching mechanism, wherein:
the monitoring circuit is configured such that, when the housing cover is mounted on the at least one battery cell, the switching mechanism is electrically conductively connected to the battery cell housing, and is also electrically conductively connected to the electrode; and
the monitoring circuit is further configured to open the switching mechanism in response to receiving a malfunction signal indicating that a value of a current flowing through the switching mechanism has exceeded a current strength limit value, the switching mechanism being configured so as to be closed during normal operation.

2. The battery according to claim 1, further comprising:
a spring contact arranged on the housing cover and connected to the switching mechanism in an electrically conductive manner,
wherein the spring contact is configured to form the electrically conductive connection between the switching mechanism and the housing when the housing cover is in place.

3. The battery according to claim 2, wherein the switching mechanism and the spring contact are connected in an electrically conductive manner via one of a stamped circuit board, a cable, and a foil circuit board.

4. The battery according to claim 1, wherein:
the switching mechanism is a thermistor element and the malfunction signal is an indication that a temperature of the switching mechanism has exceeded a temperature limit value,
the thermistor element is highly resistive when the temperature of the switching mechanism is above the temperature limit value, and
the thermistor element is configured to conduct electricity when the temperature of the switching mechanism is below the temperature limit value.

5. A motor vehicle, comprising:
a battery, including:
at least one battery cell including:
an electrode; and
an electrically conductive battery cell housing; and
a housing cover that is mountable on the battery cell housing, and that includes a monitoring circuit having a switching mechanism, wherein:
the monitoring circuit is configured such that, when the housing cover is mounted on the at least one battery cell, the switching mechanism is electrically conductively connected to the battery cell housing, and is also electrically conductively connected to the electrode; and
the monitoring circuit is further configured to open the switching mechanism in response to receiving a malfunction signal indicating that a value of a current flowing through the switching mechanism has exceeded a current strength limit value, the switching mechanism being configured so as to be closed during normal operation.

6. A battery, comprising:
at least one battery cell including:
an electrode; and
an electrically conductive battery cell housing; and
a housing cover that is mountable on the battery cell housing, and that includes a monitoring circuit having a switching mechanism, wherein:
the monitoring circuit is configured such that, when the housing cover is mounted on the at least one battery cell, the switching mechanism is electrically conductively connected to the battery cell housing, and is also electrically conductively connected to the electrode;

the switching mechanism includes a thermistor element;

the thermistor element is highly resistive when a temperature of the switching mechanism is above a temperature limit value such that the switching mechanism is configured so as to be open when the temperature of the switching mechanism has exceeded the temperature limit value; and the thermistor element is configured to conduct electricity when the temperature of the switching mechanism is below the temperature limit value such that the switching mechanism is configured so as to be closed during normal operation.

7. The battery of claim 1, wherein the monitoring circuit is further configured to monitor at least one of an electrical neutrality state of the battery cell housing and an electrical insulation state of the electrode.

\* \* \* \* \*

UNITED STATES PATENT AND TRADEMARK OFFICE
CERTIFICATE OF CORRECTION

PATENT NO. : 9,673,487 B2
APPLICATION NO. : 13/971548
DATED : June 6, 2017
INVENTOR(S) : Markus Kohlberger Page 1 of 1

It is certified that error appears in the above-identified patent and that said Letters Patent is hereby corrected as shown below:

On the Title Page

The "Foreign Patent Documents" list in Item (56) should read:

FOREIGN PATENT DOCUMENTS

| | | | |
|---|---|---|---|
| DE | 197 14 847 B4 | 10/1998 | |
| EP | 2 320 497 A1 * | 5/2011 | .......... H01M 2/32 |

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*